United States Patent
Marchant et al.

(10) Patent No.: US 10,061,674 B1
(45) Date of Patent: Aug. 28, 2018

(54) DETERMINING AND MANAGING DEPENDENCIES IN A STORAGE SYSTEM

(71) Applicant: EMC IP Holding Company LLC, Hopkinton, MA (US)

(72) Inventors: Kendra M. Marchant, Arlington, MA (US); Bruce R. Rabe, Dedham, MA (US); Rhon Porter, Sturbridge, MA (US); Donald Labaj, Northborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 168 days.

(21) Appl. No.: 14/754,520

(22) Filed: Jun. 29, 2015

(51) Int. Cl.
| | |
|---|---|
| *G06F 11/32* | (2006.01) |
| *G06F 11/30* | (2006.01) |
| *G06F 11/20* | (2006.01) |
| *H04L 29/08* | (2006.01) |
| *G06F 11/00* | (2006.01) |

(52) U.S. Cl.
CPC ...... *G06F 11/3006* (2013.01); *G06F 11/2069* (2013.01); *G06F 11/328* (2013.01); *H04L 67/1097* (2013.01); *G06F 11/008* (2013.01); *G06F 11/2053* (2013.01); *G06F 11/32* (2013.01); *G06F 11/321* (2013.01); *G06F 11/324* (2013.01)

(58) Field of Classification Search
CPC ............ G06F 11/2053; G06F 11/2056; G06F 11/2058; G06F 11/2064; G06F 11/2069; G06F 11/008; G06F 11/32; G06F 11/321; G06F 11/324; G06F 11/328
See application file for complete search history.

(56) References Cited

U.S. PATENT DOCUMENTS

| | | | |
|---|---|---|---|
| 6,208,955 B1 * | 3/2001 | Provan ................. | G06F 11/2257 703/20 |
| 7,930,583 B1 * | 4/2011 | Vemuri ................ | G06F 11/0727 709/223 |
| 8,321,867 B1 * | 11/2012 | Holl, II ................. | G06F 3/0605 714/48 |
| 8,650,224 B2 | 2/2014 | Wei et al. | |
| 9,223,822 B1 | 12/2015 | Vipul et al. | |
| 9,449,298 B2 | 9/2016 | Lowry et al. | |
| 9,477,425 B1 | 10/2016 | Zhou et al. | |

(Continued)

*Primary Examiner* — Joseph O Schell
(74) *Attorney, Agent, or Firm* — BainwoodHuang

(57) ABSTRACT

Described are methods, systems, and apparatus, including computer program products for determining and managing the dependencies of components of a storage system. Storage system object data for a plurality of storage system objects on a storage system is received by a management server. A plurality of logical dependencies are determined by the management server based on the storage system object data, where each logical dependency reflects a dependency between at least two storage system objects of the plurality of storage system objects. A tree having a plurality of nodes and a plurality of edges is formed by the management server, where each edge connects a first node and a second node, the first node representing a first storage system object and the second node representing a second storage system object, and the edge representing a logical dependency between the first storage system object and the second storage system object.

25 Claims, 7 Drawing Sheets

(56) References Cited

U.S. PATENT DOCUMENTS

| | | | |
|---|---|---|---|
| 2006/0129998 A1* | 6/2006 | Florissi | H04L 41/0631 717/127 |
| 2006/0267984 A1* | 11/2006 | Zohar | H04L 41/22 345/440 |
| 2011/0246835 A1* | 10/2011 | Hasegawa | G06F 11/0748 714/39 |
| 2013/0073522 A1* | 3/2013 | Chen | G06F 17/30194 707/687 |
| 2015/0269048 A1* | 9/2015 | Marr | G06F 11/30 714/2 |

\* cited by examiner

DETERMINING AND MANAGING DEPENDENCIES IN A STORAGE SYSTEM

FIELD OF THE TECHNOLOGY

The present technology relates generally to storage systems and, more specifically, to determining and managing the dependencies of components of a storage system.

BACKGROUND

In some applications, management servers can be used for managing back-end computer systems, such as storage systems, storage arrays, back-end servers, etc. A management server can interact with back-end computer systems to facilitate the configuration, operation, and monitoring of the back-end computer systems. The management server can send requests to the back-end computer systems to invoke features of the back-end computer systems (e.g., a feature can include the back-end system performing a function and/or providing information about the configuration or operation of the back-end system). As an example application, a client device can connect to a management server to obtain information (e.g., operational status, error, etc.) about back-end computer systems. The management server can request the information from the back-end computer systems by invoking features on the back-end computer systems and provide the information about the back-end computer systems to the client device for, e.g., display through a GUI. However, in some instances, one aspect of the backend system (e.g., a storage pool) can be relied upon by other aspects of the back-end computer system's operation (e.g., a file system on the storage pool). Conventional backend systems do not provide an efficient way to determine the scope of these dependencies.

SUMMARY OF THE TECHNOLOGY

Accordingly, there is a need for technology to facilitate efficiently determining the scope of the impact of an error.

In one aspect, there is a computer implemented method. The method can include receiving, by the management server, from a storage system, storage system object data for a plurality of storage system objects on the storage system. The method can include determining, by the management server, a plurality of logical dependencies based on the storage system object data, wherein each logical dependency reflects a dependency between at least two storage system objects of the plurality of storage system objects. The method can include forming, by the management server, a tree having a plurality of nodes and a plurality of edges, wherein each edge of the plurality of edges connects a first node and a second node, the first node representing a first storage system object and the second node representing a second storage system object of the plurality of storage system objects, and the edge representing a logical dependency between the first storage system object and the second storage system object.

In some embodiments, each storage system object of the plurality of storage system objects is one of a LUN, a file system, a file share, a file, and a logical volume. In some embodiments, each node of the plurality of nodes represents one of a storage pool, a LUN, a file system, a file share, a file, and a logical volume. In some embodiments, the method includes sending, by the management server, to a client device, the tree; and rendering, by the client device, the tree on a display. In some embodiments, a storage system object of the plurality of storage system objects is a LUN. In some embodiments, the method includes determining, by the management server, one or more hosts connected to the LUN; and rendering, by the client device, the one or more hosts as depending on the LUN.

In some embodiments, the method includes determining, by the management server, an error has occurred on an identified storage system object of the plurality of storage system objects; and determining, by the management server, based on the plurality of logical dependencies, a first subset of the plurality of storage system objects impacted by the error on the identified storage system object. In some embodiments, the method includes for each storage system object in the first subset of the plurality of storage system objects, rendering, by the client device, the node representing the storage system object with indicia of the storage system object being impacted by the error. In some embodiments, the indicia are one of a color, a text, and a line style.

In some embodiments, rendering, by the client device, the tree on the display includes displaying, by the client device, on the display each node of the plurality of nodes and each edge of the plurality of edges. In some embodiments, rendering, by the client device, the tree on the display includes displaying, by the client device, on the display each node of a subset of the plurality of nodes and each edge of a subset of the plurality of edges. In some embodiments, the subset of the plurality of nodes and the subset of the plurality of edges are selected based on a user input.

In another aspect, there is a system. The system can include a storage system. The system can include a management server. In some embodiments, the management server is configured to: receive from the storage system, storage system object data for a plurality of storage system objects on the storage system; determine a plurality of logical dependencies based on the storage system object data, wherein each logical dependency reflects a dependency between at least two storage system objects of the plurality of storage system objects; and form a tree having a plurality of nodes and a plurality of edges, wherein each edge of the plurality of edges connects a first node and a second node, the first node representing a first storage system object and the second node representing a second storage system object of the plurality of storage system objects, and the edge representing a logical dependency between the first storage system object and the second storage system object.

In some embodiments, each storage system object of the plurality of storage system objects is one of a LUN, a file system, a file share, a file, and a logical volume. In some embodiments, each node of the plurality of nodes represents one of a storage pool, a LUN, a file system, a file share, a file, and a logical volume. In some embodiments, the system includes a client device. In some embodiments, the management server is configured to send to a client device, the tree. In some embodiments, the client device is configured to render the tree on a display. In some embodiments, the management server is further configured to: determine an error has occurred on an identified storage system object of the plurality of storage system objects; and determine, based on the plurality of logical dependencies, a first subset of the plurality of storage system objects impacted by the error on the identified storage system object.

In some embodiments, the client device is further configured to: for each storage system object in the first subset of the plurality of storage system objects, render the node representing the storage system object with indicia of the storage system object being impacted by the error. In some embodiments, the indicia are one of a color, a text, and a line style. In some embodiments, the client device is configured to render the tree on the display by displaying on the display each node of the plurality of nodes and each edge of the plurality of edges. In some embodiments, the client device is configured to render the tree on the display by displaying on the display each node of a subset of the plurality of nodes and each edge of a subset of the plurality of edges. In some embodiments, the subset of the plurality of nodes and the subset of the plurality of edges are selected based on a user input.

In another aspect, there is a computer implemented method. The method can include receiving, by a management server, from a storage system, storage system object data for a plurality of storage system objects on the storage system. The method can include receiving, by the management server, an indication of an error on an identified storage system object of the plurality of storage system objects. The method can include determining, by the management server, a plurality of logical dependencies based on the storage system object data, wherein each logical dependency of the plurality of logical dependencies reflects a dependency between at least two storage system objects of the plurality of storage system objects. The method can include determining, by the management server, based on the plurality of logical dependencies, a first subset of storage system objects of the plurality of storage system objects, the first subset of storage system objects including the identified storage system object and a plurality of storage system objects with a dependency on the identified storage system object. The method can include forming, by the management server, a tree having a plurality of nodes and a plurality of edges, wherein each edge of the plurality of edges connects a first node and a second node, the first node representing a first storage system object and the second node representing a second storage system object of the first subset of storage system objects, and the edge representing a logical dependency between the first storage system object and the second storage system object.

Other aspects and advantages of the present technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which.

DETAILED DESCRIPTION

Figure 1:
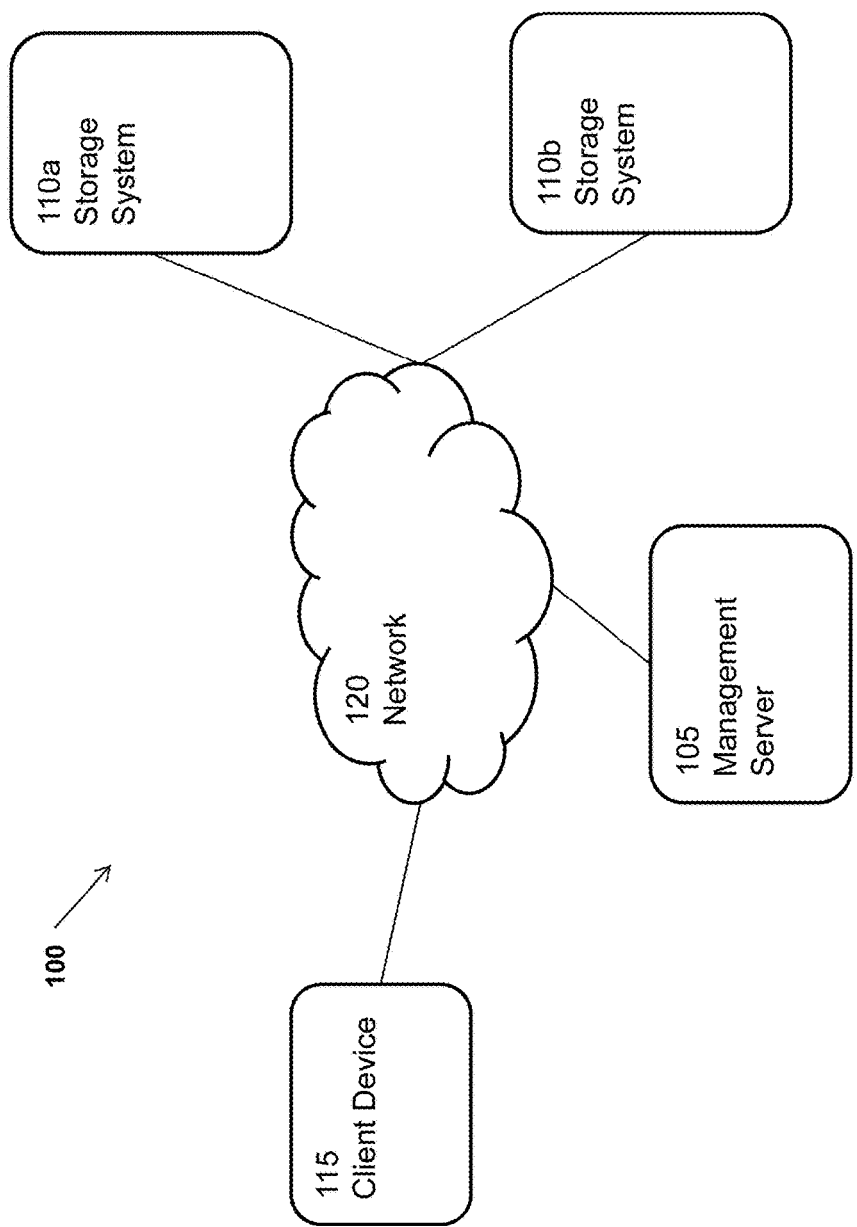
FIG. 1 depicts a system in accordance with the technology.

FIG. 1 depicts system 100 in accordance with the technology. System 100 includes management server 105, storage systems 110, and client device 115. In system 100, server 105, storage systems 110, and client device 115 can be in data communication with each other via network 120. Management server 105 and client device 115 can each include one or more computing devices. Storage systems 110 can each include one or more storage systems. In some embodiments, a storage system can include one or more storage processors, disk enclosures, disk arrays, and/or storage devices (e.g., solid state or magnetic disk drives). It should be appreciated that system 100 is an exemplary system in accordance with the technology, and other configurations are contemplated. For example, the management server can be a software module running on a back-end server, the client device 115, or storage systems 110.

Figure 2:
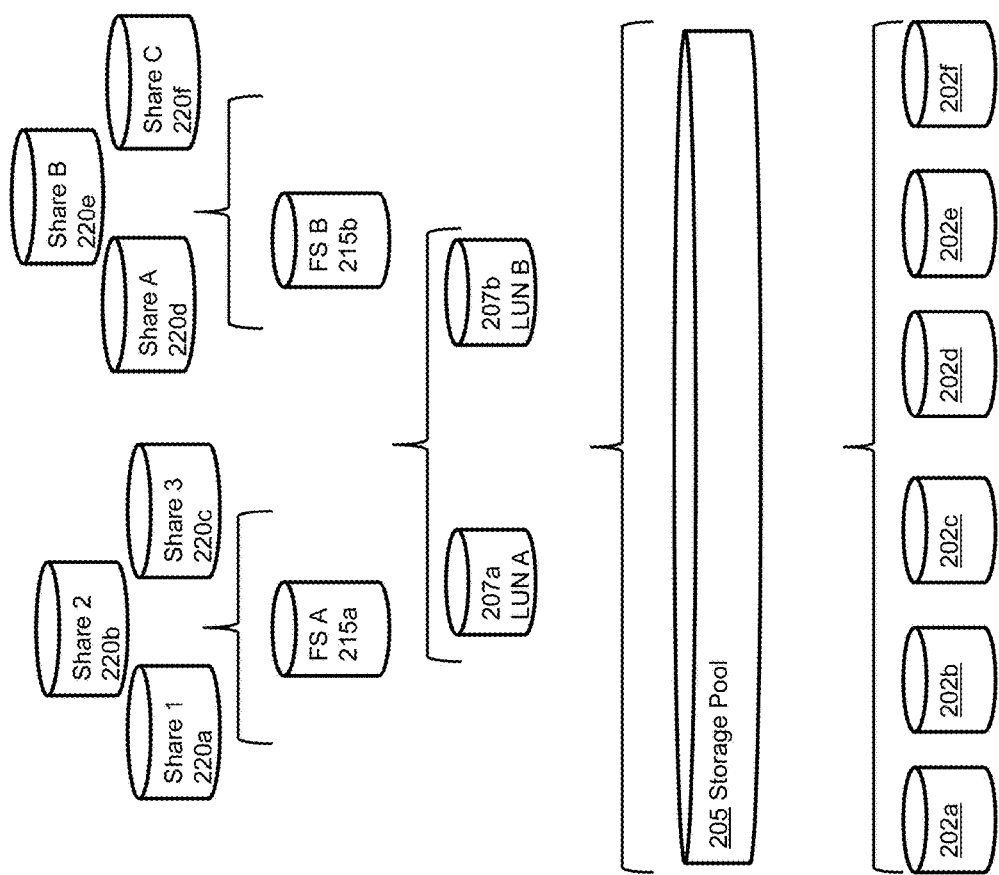
FIG. 2 depicts exemplary logical relationships between hardware in a storage system storage system and logical storage system objects.

FIG. 2 depicts exemplary logical relationships between hardware in storage system storage system 110a and logical storage system objects. A storage system can include one or more storage devices 202a-202f (e.g., solid state or magnetic disk drives). The storage system can include one or more logical storage system objects, including storage pool 205, LUNs 207a and 207b, file systems 215a and 215b, and file shares 220a-220f. The illustrated logical relationships can be used to provide storage pool-backed file systems in a storage system. For example, storage devices 202a-202f can be located in a disk array enclosure of storage system 110a. Storage system 100 can include hardware, firmware, and/or software to implement the illustrated logical relationships. As illustrated in FIG. 2, storage pool 205 can be formed from hardware storage devices 202a-202f (e.g., physical storage devices). For example, the storage space of one or more of hardware storage devices 202a-202f can be added to storage pool 205, making the storage space from one or more of hardware storage devices 202a-202f available to be provisioned from storage pool 205. LUNs 207a and 207b can be formed on storage pool 205. For example, a portion of the storage space from storage pool 205 (which in turn is physical storage space from one or more of hardware storage devices 202a-202f) can be provisioned and/or assigned to LUN A 207a and a portion of the storage space from storage pool 205 (which in turn is storage space from one or more of hardware storage devices 202a-202f) can be provisioned and/or assigned to LUN B 207b.

File systems 215a and 215b can be created on LUNs 207a and 207b. For example, a portion of the storage space from one or more of LUNs 207a and 207b can be assigned to file system 215a, and a portion of the storage space from one or more of LUNs 207a and 207b can be assigned to file system 215b. As another example, storage space from LUN A 207a can be assigned to file system 215a, and storage space from LUN B 207b can be assigned to file system 215b. File shares 220a-220f can be created on file systems 215a and 215b. For example, file shares 220a-220c can be created on file system 215a. File shares 220d-220f can be created on file system 215b. Storage system 100 can maintain logical mappings between the address spaces of file systems 215a and 215b, LUNs 207a and 207b, and storage devices 202a-202f. In some embodiments, provisioning storage space in a storage pool for a LUN can include creating the mapping between the LUN's address space and the storage pool's address space. As an example of operation of storage system 100 providing the illustrated logical arrangement, if a host writes data to file system 215a to be stored at a logical address on LUN A 207a, the data can be stored on portions of hardware storage devices 202a-202f that are assigned to LUN A 207a via storage pool 205 and map to the logical address. It should be appreciated storage system 110b can contain one or more storage devices, one or more storage pools, one or more LUNs, one or more file systems, and/or one or more file shares in a similar configuration.

It should be appreciated that logical relationships illustrated in FIG. 2 are exemplary logical relationships in accordance with the technology. Other relationships are contemplated. For example, one or more additional layers of virtualization and/or abstraction can be utilized by a storage system in providing storage pool-backed file systems. In some storage systems, a LUN can be referred to as a logical volume and/or logical disk volume.

Figure 3:
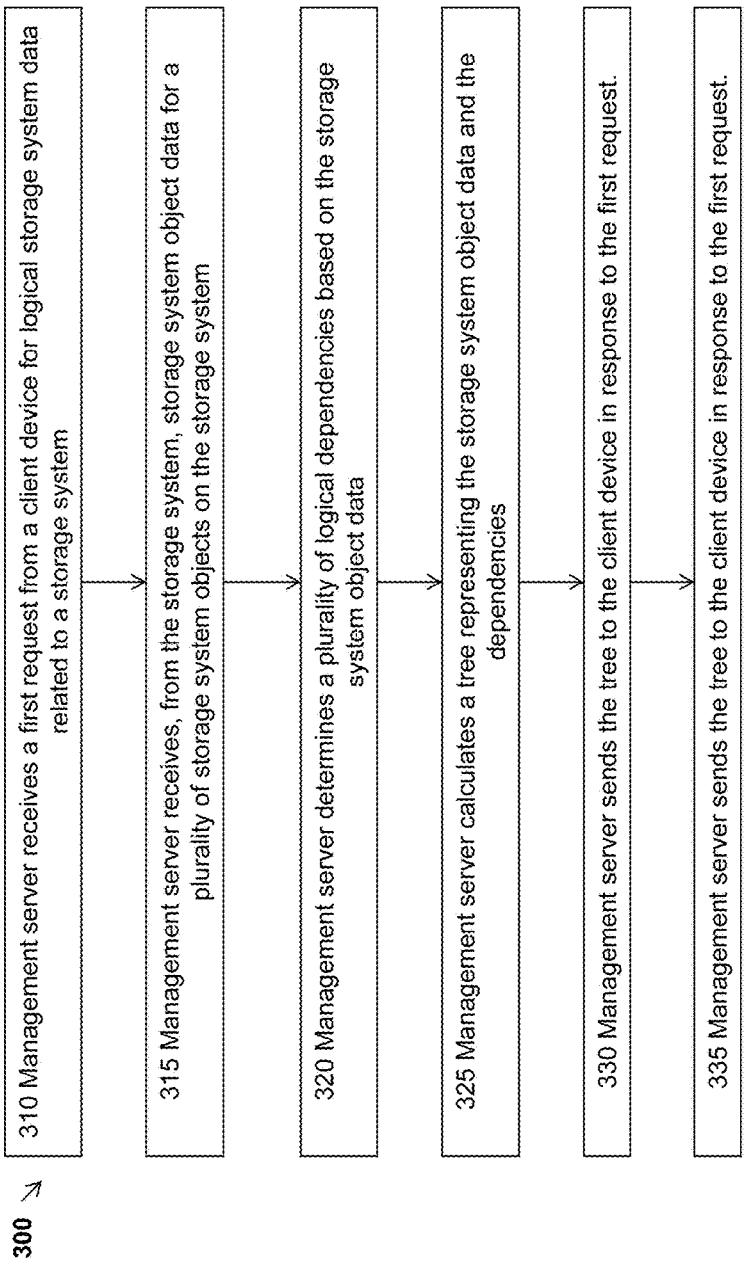
FIG. 3 depicts a flow chart illustrating a method in accordance with the technology.

As described above. Storage system objects can depend on other storage system objects. The technology can facilitate determining these dependencies. FIG. 3 depicts a flow chart 300 illustrating a method in accordance with the technology. At step 310, a management server receives a first request from a client device for logical storage system data related to a storage system. For example, client device 115 can send a request via network 120 to management server 105 for logical storage system data related to storage system 110a. At step 315, the management server receives, from the storage system, storage system object data for a plurality of storage system objects on the storage system. For example, management server 105 can query storage system 110a for storage system object data. Storage system 110a can return storage system object data for the storage system objects on storage system 110a, including, e.g., data for, storage pool 205, LUNs 207a and 207b, file systems 215a and 215b, and file shares 220a-220f. In some embodiments, the storage system object data can include the logical parent or parents for each storage system object. For example, with reference to storage system 110a, the storage system object data can indicate that storage pool 205 is the parent of LUN 207a, storage pool 205 is the parent of LUN 207b, LUN 207a is the parent of file system 215a, LUN 207b is the parent of file system 215b, file system is the parent of share 220a, file system is the parent of share 220b, file system is the parent of share 220c, file system is the parent of share 220c, file system is the parent of share 220d, and file system is the parent of share 220e.

At step 320, the management server determines a plurality of logical dependencies based on the storage system object data. Each logical dependency can reflect a dependency between at least two storage system objects. A logical dependency can occur when a storage system object relies on resources in another logical resource. For example, with reference to storage system 110a, LUN 207a is provisioned from storage pool 205, and accordingly, relies on resources (e.g., storage space) in storage pool 205 to operate. As another example, share 220e resides on file system 215b, and accordingly, relies on resources (e.g., storage space) on file system 215b. As still another example, share 220e relies on resources (e.g., storage space) in storage pool 205. In some embodiments, the management server can determine all dependencies for each storage system object. In some embodiments, the management server can determine the dependencies for a subset of the storage system objects.

At step 325, the management server calculates a tree representing the storage system object data and the dependencies. In some embodiments, the tree has a plurality of nodes and a plurality of edges, where each edge represents a dependency between two nodes representing storage system objects. At step 330, the management server sends the tree to the client device in response to the first request. For example, management server 105 can send the tree to client device 115. In some embodiments, the tree can be a data structure. At step 335, the client device renders the received tree. Examples of the client device rendering the tree are shown in FIGS. 4 and 5A-5C.

Figure 4:
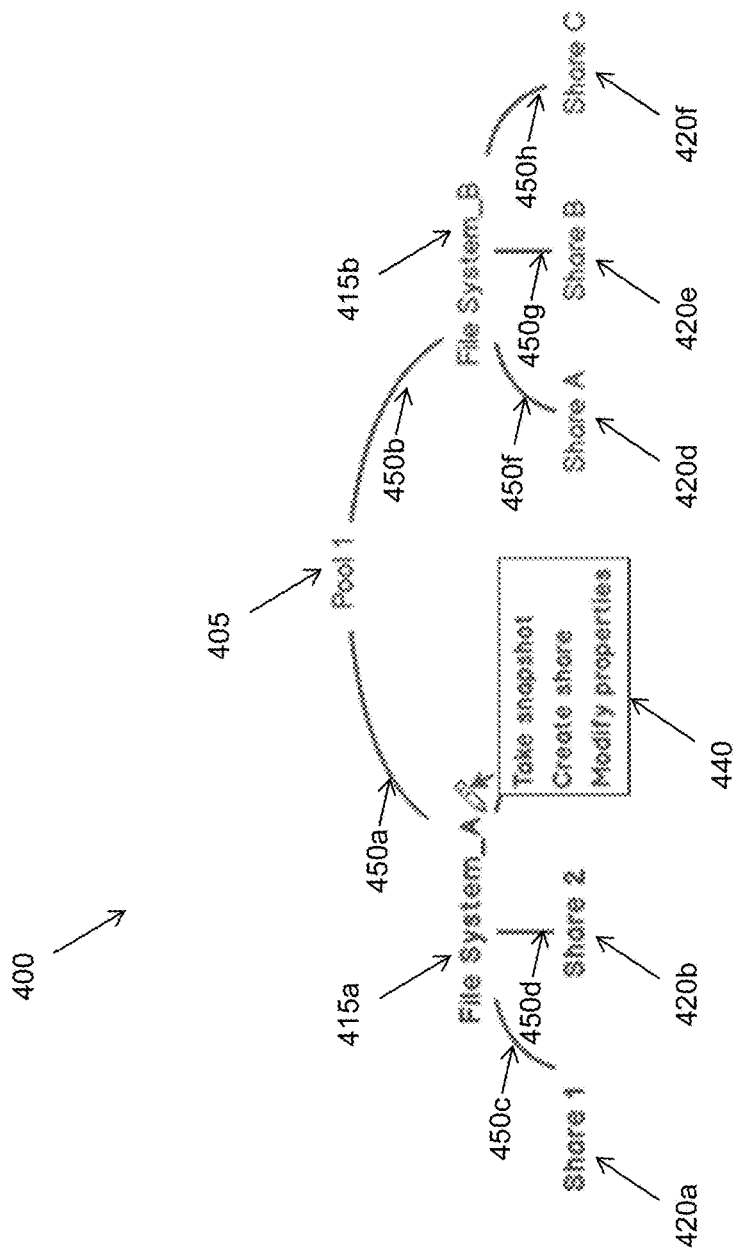
FIG. 4 illustrates a rendered tree generated for a storage system.

FIG. 4 illustrates a rendered tree 400 generated for storage system 110b. As illustrated, tree 400 includes node 405 representing storage pool 205, node 415a and node 415b representing file system 215a and file systems 215b, respectively, and node 420a, node 420b, node 420d, node 420e, and node 420f representing file share 220a, file share 220b, file share 220d, file share 220e, and file share 220f. In the illustrated embodiment, the node for file share 220c is occluded by context menu 440. The operation of context menu 440 will be described in greater detail below. Tree 400 includes edges 450, indicating dependencies between the nodes in tree 400. For example, edge 450a indicates file system 215a (represented in tree 400 by node 415a) depends on storage pool 205 (represented in tree 400 by node 405). As another example, edge 450c indicates file share 220a (represented in tree 400 by node 420a) depends on file system 215a (represented in tree 400 by node 415a). The remaining edges 450 similarly indicate dependencies between storage system objects (e.g., represented by nodes in tree 400). Beneficially, tree 400 can facilitate a system administrator in determining dependencies between storage system objects. This can permit the system administrator to determine which storage system objects will be impacted by, for example, modifying or servicing, other storage system objects. As an example, a system administrator can wish to expand files system 215a. In some storage systems, expanding a file system can cause the performance of the file system to degrade while new storage space is being initialized and added to the file system. The file system's degraded performance can impact users of shares on that file system. Using tree 400, the system administrator can see which file shares will be impacted by the maintenance.

Figure 5A:
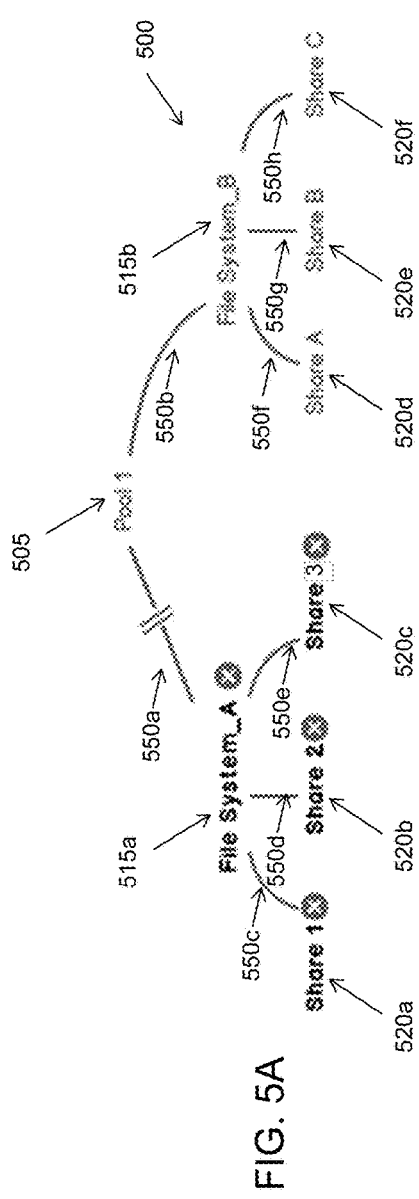
FIGS. 5A-5C illustrate rendered trees generated for a storage system.
Figure 5B:
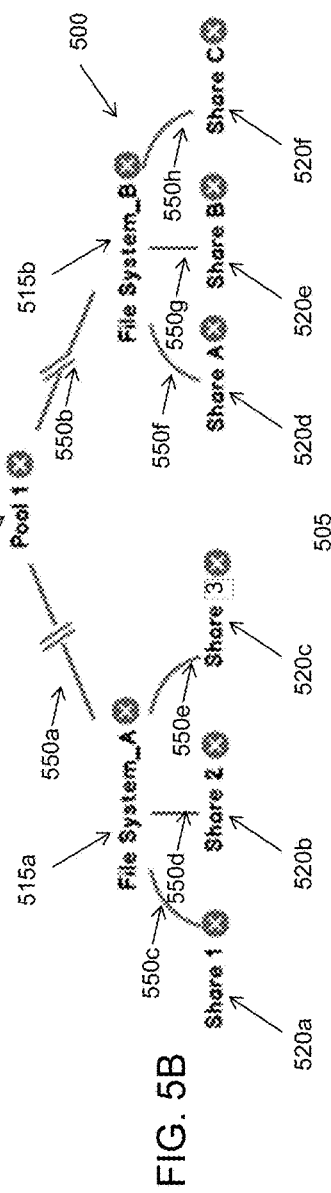
Figure 5C:
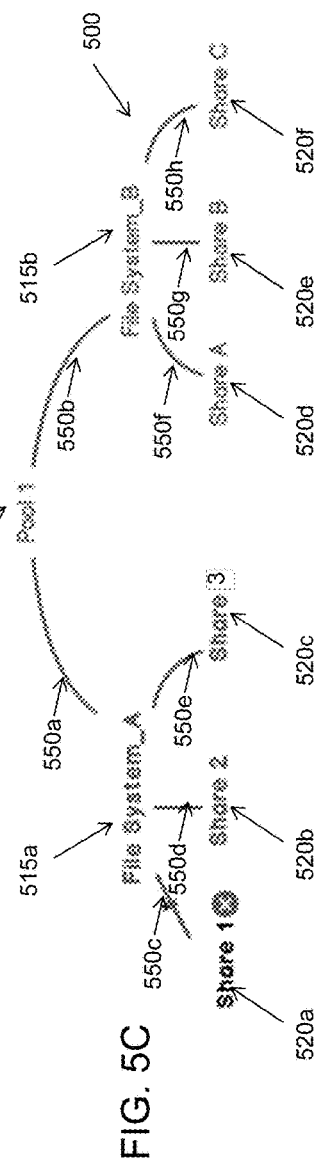

In some embodiments, the technology can facilitate determining the storage system objects affected by an error on another storage system object. For example, the error can be reduced performance as a result of a failure on the storage system object (or its underlying hardware) or reduced performance due to a maintenance operation, such as expanding a storage pool, on the storage system object (or its underlying hardware). More generally, the error can indicate any state that can impact the operation of the storage system object and/or the other storage system objects that depend on it. The management server can receive the indication from, e.g., the storage system. FIGS. 5A-5C illustrate rendered trees 500 generated for storage system 110b. In the illustrated trees 500, errors and the affected storage system objects are shown on the rendered trees 500.

Referring to FIG. 5A, tree 500 includes node 505 representing storage pool 205, node 515a and node 515b representing file system 215a and file systems 215b, respectively, and node 520a, node 520b, node 520c, node 520d, node 520e, and node 520f representing file share 220a, file share 220b, file share 220c, file share 220d, file share 220e, and file share 220f, respectively. Tree 500 includes edges 550 indicating dependencies between the nodes in tree 500. As illustrated, tree 500 indicates an error on storage pool 205, as shown by edge 550a with two crossing lines. Tree 500 indicates file system 215a (represented by node 515a) is impacted by the error on storage pool 205 with an "x" next to node 515a. Tree 500 indicates file share 220a, file share 220b, and file share 220c are impacted by the error on file system 215a with an "x" next to nodes 420a, 420b, and 420c. It should be appreciated that the error on storage pool 205 only impacts file system 515a. No error is indicated for file system 215b.

Referring to FIG. 5B, tree 500 includes node 505 representing storage pool 205, node 515a and node 515b representing file system 215a and file systems 215b, respectively, and node 520a, node 520b, node 520c, node 520d, node 520e, and node 520f representing file share 220a, file share 220b, file share 220c, file share 220d, file share 220e, and file share 220f, respectively. Tree 500 includes edges 550 indicating dependencies between the nodes in tree 500. As illustrated, tree 500 indicates an error on storage pool 205, as shown by edges 550a and 550b with two crossing lines. Tree 500 indicates file system 215a (represented by node 515a) is impacted by the error on storage pool 205 with an "x" next to node 515a. Tree 500 indicates file share 220a, file share 220b, and file share 220c are impacted by the error on file system 215a with and "x" next to nodes 520a, 520b, and 520c. Tree 500 indicates file system 215b (represented by node 515b) is impacted by the error on storage pool 205 with an "x" next to node 515b. Tree 500 indicates file share 220d, file share 220e, and file share 220f are impacted by the error on file system 215b with an "x" next to nodes 520d, 520e, and 520f.

Figure 6:
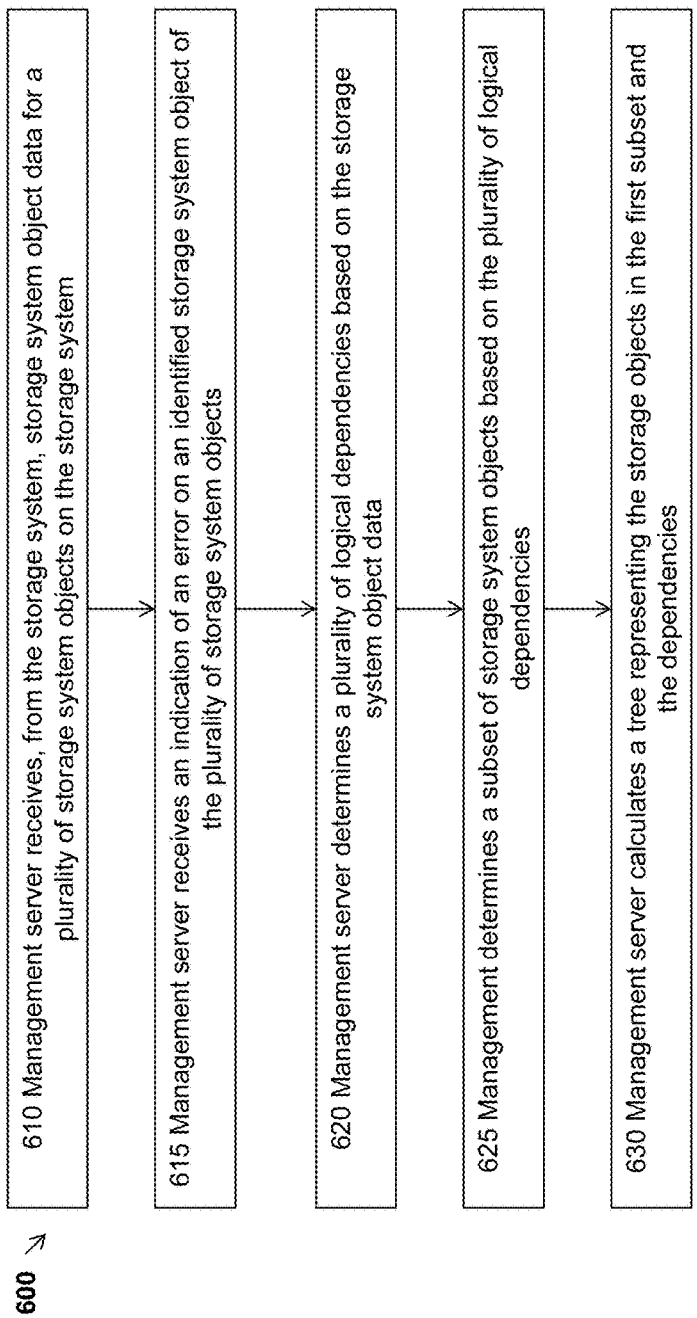
FIG. 6 depicts a flow chart illustrating a method in accordance with the technology.

Referring to FIG. 5C, tree 500 includes node 505 representing storage pool 205, node 515a and node 515b representing file system 215a and file systems 215b, respectively, and node 520a, node 520b, node 520c, node 520d, node 520e, and node 520f representing file share 220a, file share 220b, file share 220c, file share 220d, file share 220e, and file share 220f, respectively. Tree 500 includes edges 550 indicating dependencies between the nodes in tree 500. As illustrated, tree 500 indicates an error on file share 220a (represented by node 520a) with an "x" next to node 520a. Indicia indicating a storage system object is impacted by an error can include a color, a text, and/or a line style FIG. 6 depicts a flow chart 600 illustrating a method in accordance with the technology. At step 610, the management server receives, from the storage system, storage system object data for a plurality of storage system objects on the storage system. For example, management server 105 can query storage system 110a for storage system object data. Storage system 110a can return storage system object data for the storage system objects on storage system 110a, including, e.g., data for, storage pool 205, LUNs 207a and 207b, file systems 215a and 215b, and file shares 220a-220f. In some embodiments, the storage system object data can include the logical parent or parents for each storage system object. For example, with reference to storage system 110a, the storage system object data can indicate that storage pool 205 is the parent of LUN 207a, storage pool 205 is the parent of LUN 207b, LUN 207a is the parent of file system 215a, LUN 207b is the parent of file system 215b, file system is the parent of share 220a, file system is the parent of share 220b, file system is the parent of share 220c, file system is the parent of share 220d, and file system is the parent of share 220e.

At step 615, the management server receives an indication of an error on an identified storage system object of the plurality of storage system objects. The error can be any fault, malfunction or other condition affecting the operation of the storage system object. For example, the error can be reduced performance as a result of a failure on the storage system object (or its underlying hardware) or reduced performance due to a maintenance operation on the storage system object (or its underlying hardware). More generally, the error can indicate any state that could impact the operation of the storage system object and/or the other storage system objects that depend on it. The management server can receive the indication from, e.g., the storage system.

At step 620, the management server determines a plurality of logical dependencies based on the storage system object data. Each logical dependency can reflect a dependency between at least two storage system objects of the plurality of storage system objects. As previously discussed, a logical dependency can occur when a storage system object relies on resources in another logical resource. For example, with reference to storage system 110a, LUN 207a is provisioned from storage pool 205, and accordingly, relies on resources (e.g., storage space) in storage pool 205 to operate. As another example, share 220e resides on file system 215b, and accordingly, relies on resources (e.g., storage space) on file system 215b. As still another example, share 220e relies on resources (e.g., storage space) in storage pool 205. In some embodiments, the management server can determine all dependencies for each storage system object. In some embodiments, the management server can determine the dependencies for a subset of the storage system objects.

At step 625, the management determines a subset of storage system objects based on the plurality of logical dependencies. The subset of storage system objects can include the identified storage system object and a plurality of storage system objects with a dependency on the identified storage system object. The storage system objects in the subset can have a direct dependency on the identified storage system object (e.g., as file share 220a has a direct dependency on file system 215a) and/or an indirect dependency on the identified storage system object (e.g., as file share 220a has an indirect dependency on storage pool 205).

At step 630, the management server calculates a tree representing the storage objects in the first subset and the dependencies. In some embodiments, the tree has a plurality of nodes and a plurality of edges, where each edge of the plurality of edges connects a first node and a second node, the first node representing a first storage system object and the second node representing a second storage system object of the first subset of storage system objects, and the edge representing a logical dependency between the first storage system object and the second storage system object. Beneficially, the tree can be used to identify those storage system objects that are impacted by the error.

Figure 7:
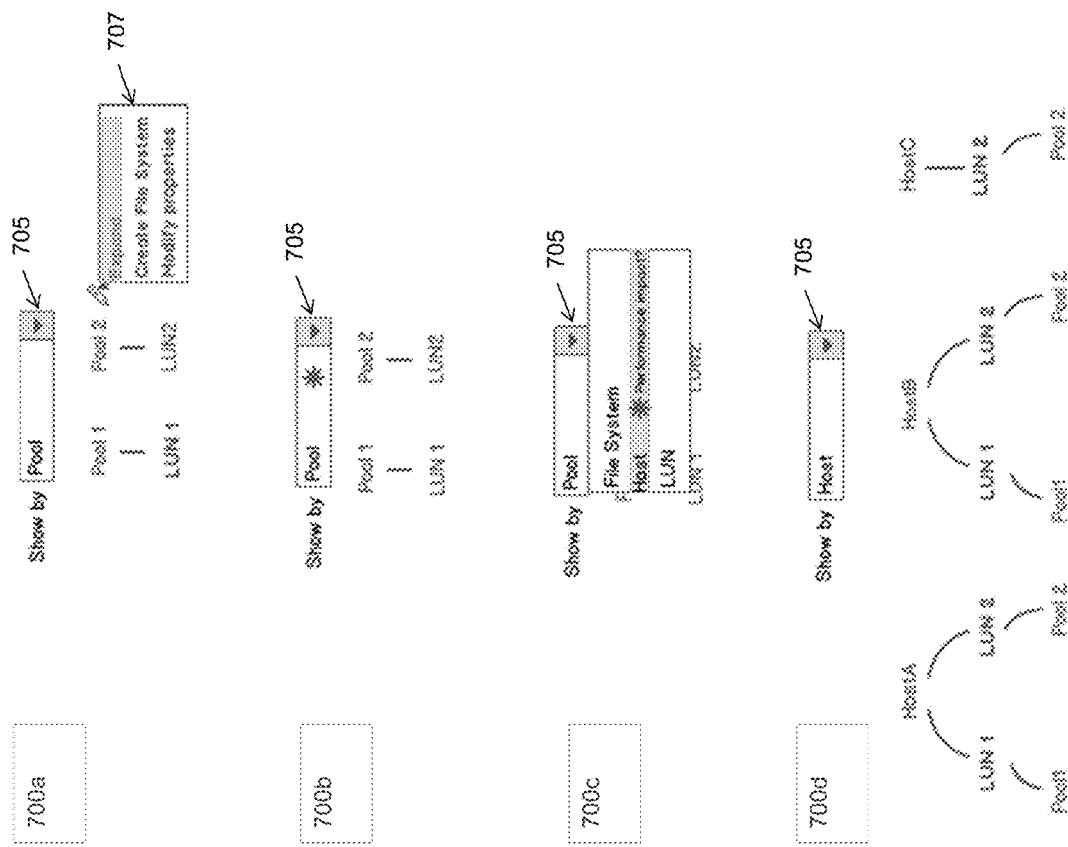
FIG. 7 illustrates a sequence of displays for performing a maintenance activity on a storage system.

FIG. 7 illustrates a sequence of displays 700 for performing a maintenance activity on a storage system. The displays shown in FIG. 7 leverage the above described technology to identify storage system objects and the dependencies between the storage system objects. Referring to display 700a, drop down box 705 (the "show by" dialog box") allows a user to control which storage system objects are shown. For example, in display 700a, "Pool" has been selected in drop down box 705. As a result, the dependencies between storage pools ("Pool 1" and "Pool 2") and LUNs ("LUN 1" and "LUN 2") are shown. Context menu 707 allows a user to select an operation on a storage system object. For example, in the illustrated display 700a, the user has the option to expand, create a file system on, or modify the properties of storage pool "Pool 2." As shown for display 700a, the user has selected to expand storage pool "Pool 2." Expanding a storage pool can involve a number of operations that impact the performance of the storage pool (e.g., by slowing down the speed at which the storage pool processes I/O commands).

Display 700*b* illustrates a screen shown after the user has started expansion of storage pool "Pool 2." As shown the dependencies between storage pools ("Pool 1" and "Pool 2") and LUNs ("LUN 1" and "LUN 2") are displayed. Drop down box 705 in display 700*b* also includes an asterisk indicating that there are storage system objects with impacted performance. Display 700*c* illustrates a screen in which the user selects an option from drop down box 705. In drop down box 705, an asterisk is shown next to the "Host" option to indicate that one or more hosts have impacted performance due to the expansion of storage pool "Pool 2." Display 700*d* illustrates a screen after the "Host" option has been selected in drop down box 705. Display 700*d* shows the hosts impacted by the expansion of storage pool "Pool 2," (e.g., "Host A," "Host B," and "Host C") and the storage pool objects on which they depend. For example, each of "Host A," "Host B," and "Host C" depend on storage pool "Pool 2." in which the user selects an option from drop down box 705.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the technology by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of a computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Hypertext Transfer Protocol (HTTP), Session Initiation Protocol (SIP), a Global System for Mobile Communications (GSM) protocol, Universal Mobile Telecommunications System (UMTS), 3GPP Long Term Evolution (LTE) and/or other communication protocols.

Devices of a computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device includes, for example, a Blackberry® from Research in Motion, an iPhone® from Apple Corporation, and/or an Android™-based device.

Comprise, include, and/or plural forms of each are open ended and include the listed parts and can include additional parts that are not listed. And/or is open ended and includes one or more of the listed parts and combinations of the listed parts.

One skilled in the art will realize the technology may be embodied in other specific forms without departing from the spirit or essential characteristics thereof. The foregoing embodiments are therefore to be considered in all respects illustrative rather than limiting of the technology described herein.

What is claimed is:

1. A computer implemented method comprising:
   receiving, by a management server, from a storage system, storage system object data for a plurality of storage system objects on the storage system;
   determining, by the management server, a plurality of logical dependencies based on the storage system object data, wherein each logical dependency reflects a dependency between at least two storage system objects of the plurality of storage system objects;
   forming, by the management server, a tree having a plurality of nodes and a plurality of edges, wherein each edge of the plurality of edges connects a first node and a second node, the first node representing a first storage system object and the second node representing a second storage system object of the plurality of storage system objects, and the edge representing a logical dependency between the first storage system object and the second storage system object;
   initiating a first rendering of the tree on a display of a client device, the first rendering displaying the tree including at least the first node representing the first storage system object, the second node representing the second storage system object, and the edge representing the logical dependency between the first storage system object and the second storage system object;
   initiating a first predetermined event associated with the first storage system object on the storage system, the first predetermined event causing an impact upon at least the second node representing the second storage system object on the storage system due to the logical dependency between the first storage system object and the second storage system object;
   having caused the impact upon at least the second node representing the second storage system object by the first predetermined event, initiating a second rendering of the tree on the display of the client device, the second rendering displaying indicia associated with one or more of the second node representing the second storage system object and the edge representing the logical dependency, the indicia indicating a level of degraded performance of at least the second storage system object represented by the second node; and
   having indicated the level of degraded performance of at least the second storage system object represented by the second node, initiating a second predetermined event associated with the first storage system object on the storage system to cause a reduction in the indicated level of degraded performance of at least the second node representing the second storage system object on the storage system.

2. The method of claim 1, wherein each storage system object of the plurality of storage system objects is at least one of a LUN, a file system, a file share, a file, and a logical volume.

3. The method of claim 1, wherein each node of the plurality of nodes represents one of a storage pool, a LUN, a file system, a file share, a file, and a logical volume.

4. The method of claim 1, further comprising:
   sending, by the management server, to the client device, the tree and
   rendering, by the client device, the tree on the display.

5. The method of claim 4, wherein a storage system object of the plurality of storage system objects is a LUN, the method further comprising:
   determining, by the management server, one or more hosts connected to the LUN; and
   rendering, by the client device, the one or more hosts as depending on the LUN.

6. The method of claim 1, further comprising:
   determining, by the management server, an error has occurred on an identified storage system object of the plurality of storage system objects; and
   determining, by the management server, based on the plurality of logical dependencies, a first subset of the plurality of storage system objects impacted by the error on the identified storage system object.

7. The method of claim 6, further comprising:
   for each storage system object in the first subset of the plurality of storage system objects, rendering, by the client device, the node representing the storage system object with second indicia of the storage system object being impacted by the error.

8. The method of claim 7, wherein the second indicia are one of a color, a text, and a line style.

9. The method of claim 4, wherein rendering, by the client device, the tree on the display comprises displaying, by the client device, on the display each node of the plurality of nodes and each edge of the plurality of edges.

10. The method of claim 4, wherein rendering, by the client device, the tree on the display comprises displaying, by the client device, on the display each node of a subset of the plurality of nodes and each edge of a subset of the plurality of edges.

11. The method of claim 10, wherein the subset of the plurality of nodes and the subset of the plurality of edges are selected based on a user input.

12. A system comprising:
   a storage system;
   a management server,
   wherein the management server is configured to:
      receive from the storage system, storage system object data for a plurality of storage system objects on the storage system;
      determine a plurality of logical dependencies based on the storage system object data, wherein each logical dependency reflects a dependency between at least two storage system objects of the plurality of storage system objects;

form a tree having a plurality of nodes and a plurality of edges, wherein each edge of the plurality of edges connects a first node and a second node, the first node representing a first storage system object and the second node representing a second storage system object of the plurality of storage system objects, and the edge representing a logical dependency between the first storage system object and the second storage system object;

initiate a first rendering of the tree on a display of a client device, wherein the first rendering displays the tree including at least the first node representing the first storage system object, the second node representing the second storage system object, and the edge representing the logical dependency between the first storage system object and the second storage system object;

initiate a first predetermined event associated with the first storage system object on the storage system, wherein the first predetermined event causes an impact upon at least the second node representing the second storage system object on the storage system due to the logical dependency between the first storage system object and the second storage system object;

having caused the impact upon at least the second node representing the second storage system object by the first predetermined event, initiate a second rendering of the tree on the display of the client device, wherein the second rendering displays indicia associated with one or more of the second node representing the second storage system object and the edge representing the logical dependency, the indicia indicating a level of degraded performance of at least the second storage system object represented by the second node; and having indicated the level of degraded performance of at least the second storage system object represented by the second node, initiate a second predetermined event associated with the first storage system object on the storage system to cause a reduction in the indicated level of degraded performance of at least the second node representing the second storage system object on the storage system.

13. The system of claim 12, wherein each storage system object of the plurality of storage system objects is at least one of a LUN, a file system, a file share, a file, and a logical volume.

14. The system of claim 12, wherein each node of the plurality of nodes represents one of a storage pool, a LUN, a file system, a file share, a file, and a logical volume.

15. The system of claim 12, wherein the management server is configured to send to the client device, the tree; and wherein the client device is configured to render the tree on the display.

16. The system of claim 15, wherein the management server is further configured to:

determine an error has occurred on an identified storage system object of the plurality of storage system objects; and determine, based on the plurality of logical dependencies, a first subset of the plurality of storage system objects impacted by the error on the identified storage system object.

17. The system of claim 16, wherein the client device is further configured to:

for each storage system object in the first subset of the plurality of storage system objects, render the node representing the storage system object with second indicia of the storage system object being impacted by the error.

18. The system of claim 17, wherein the second indicia are one of a color, a text, and a line style.

19. The system of claim 15, wherein the client device is configured to render the tree on the display by displaying on the display each node of the plurality of nodes and each edge of the plurality of edges.

20. The system of claim 15, wherein the client device is configured to render the tree on the display by displaying on the display each node of a subset of the plurality of nodes and each edge of a subset of the plurality of edges.

21. The system of claim 20, wherein the subset of the plurality of nodes and the subset of the plurality of edges are selected based on a user input.

22. The method of claim 1 wherein the initiating of the first predetermined event includes initiating selecting an operation to be performed on the first storage system object.

23. The method of claim 22 wherein the first storage system object is a storage pool, and wherein the operation includes one of expanding the storage pool, creating a file system on the storage pool, and modifying one or more properties of the storage pool.

24. The method of claim 1 wherein the initiating of the first predetermined event includes initiating determining an error on the first storage system object.

25. The method of claim 24 wherein the error is associated with one of a failure occurring on the first storage system object, and a maintenance operation being performed on the first storage system object.

* * * * *